Figure 1:
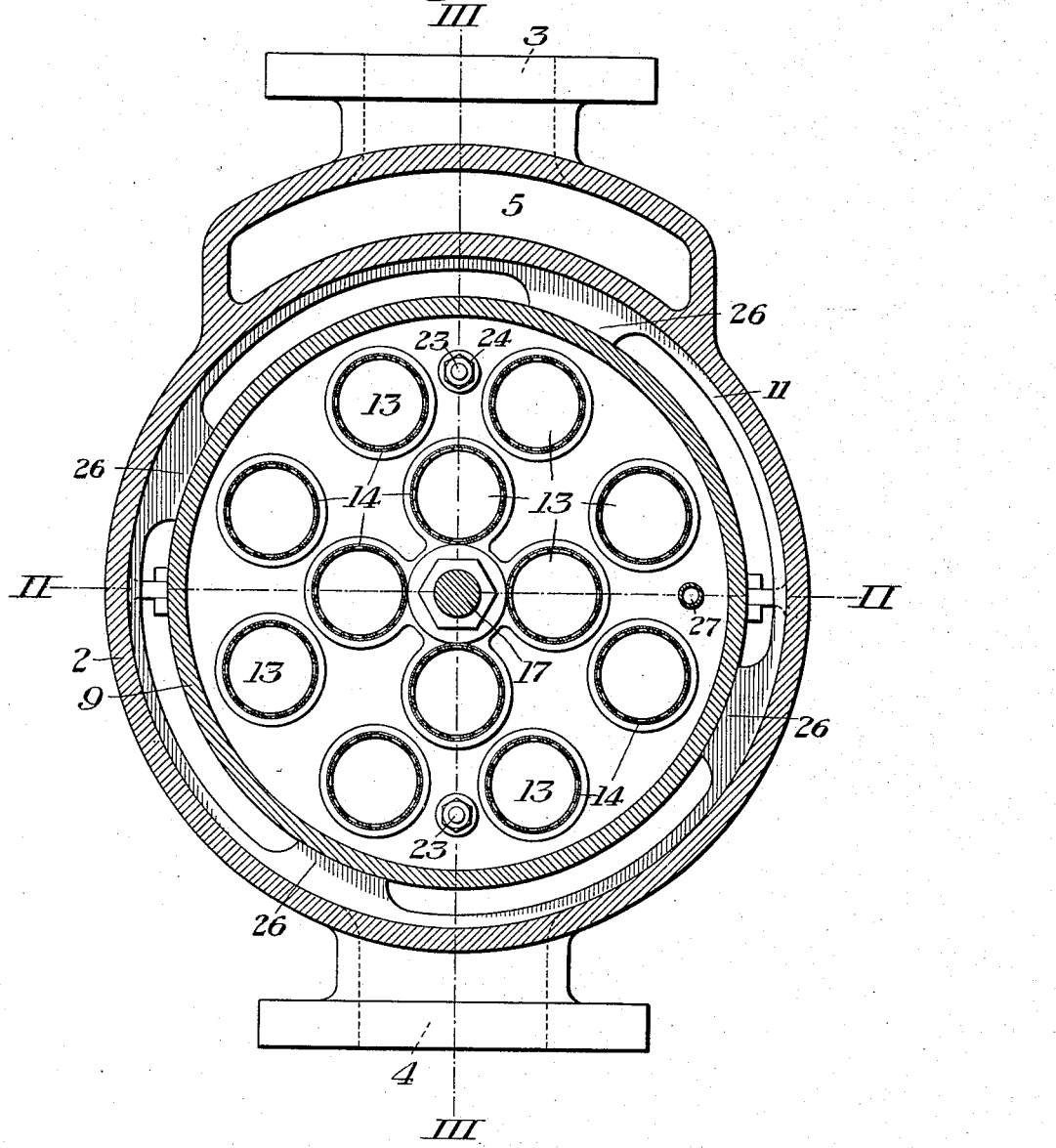

W. S. ELLIOTT.
STRAINER OR FILTER.
APPLICATION FILED JAN. 8, 1915.

1,172,689.

Patented Feb. 22, 1916.
4 SHEETS—SHEET 1.

WITNESSES

INVENTOR

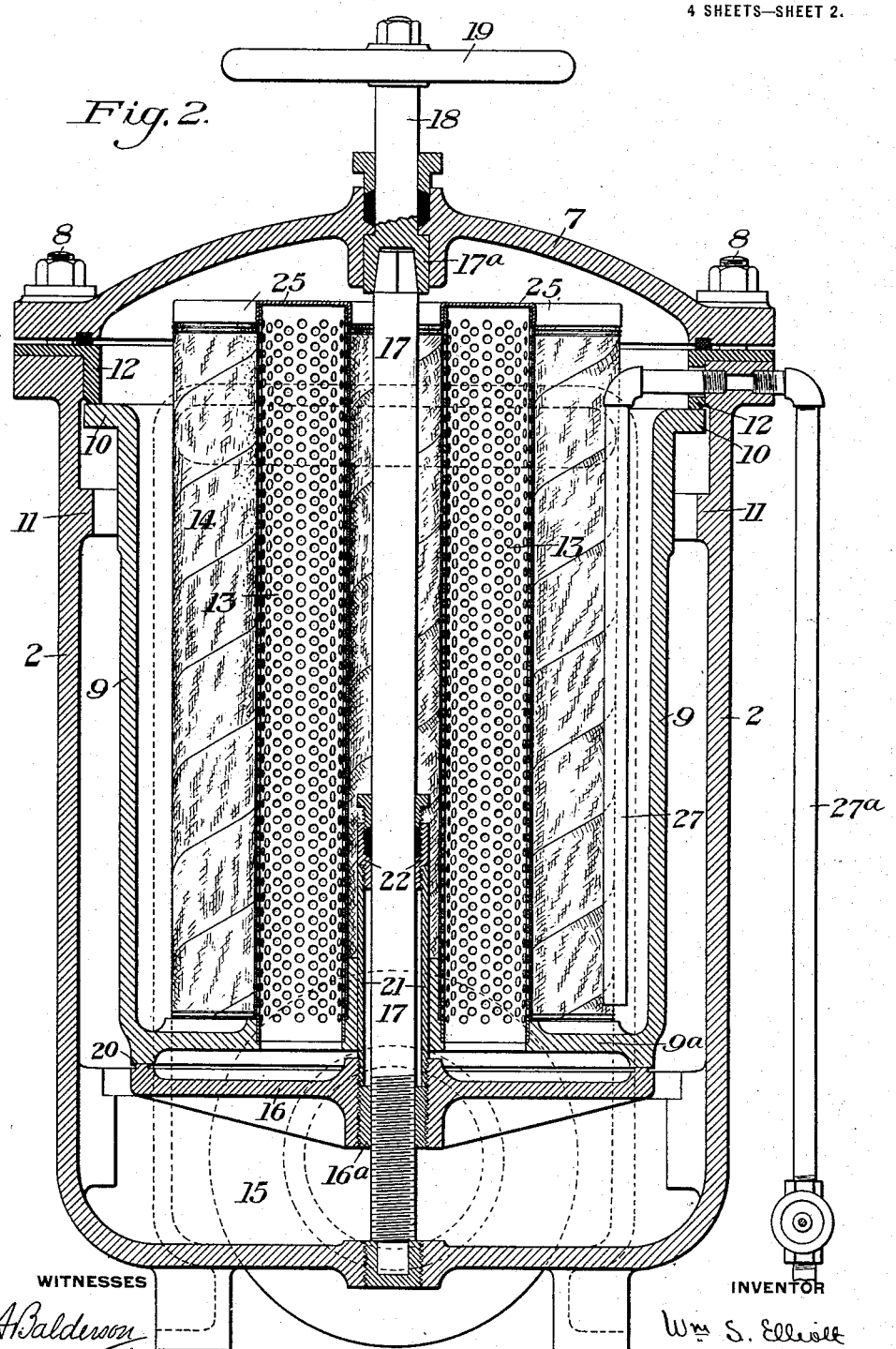

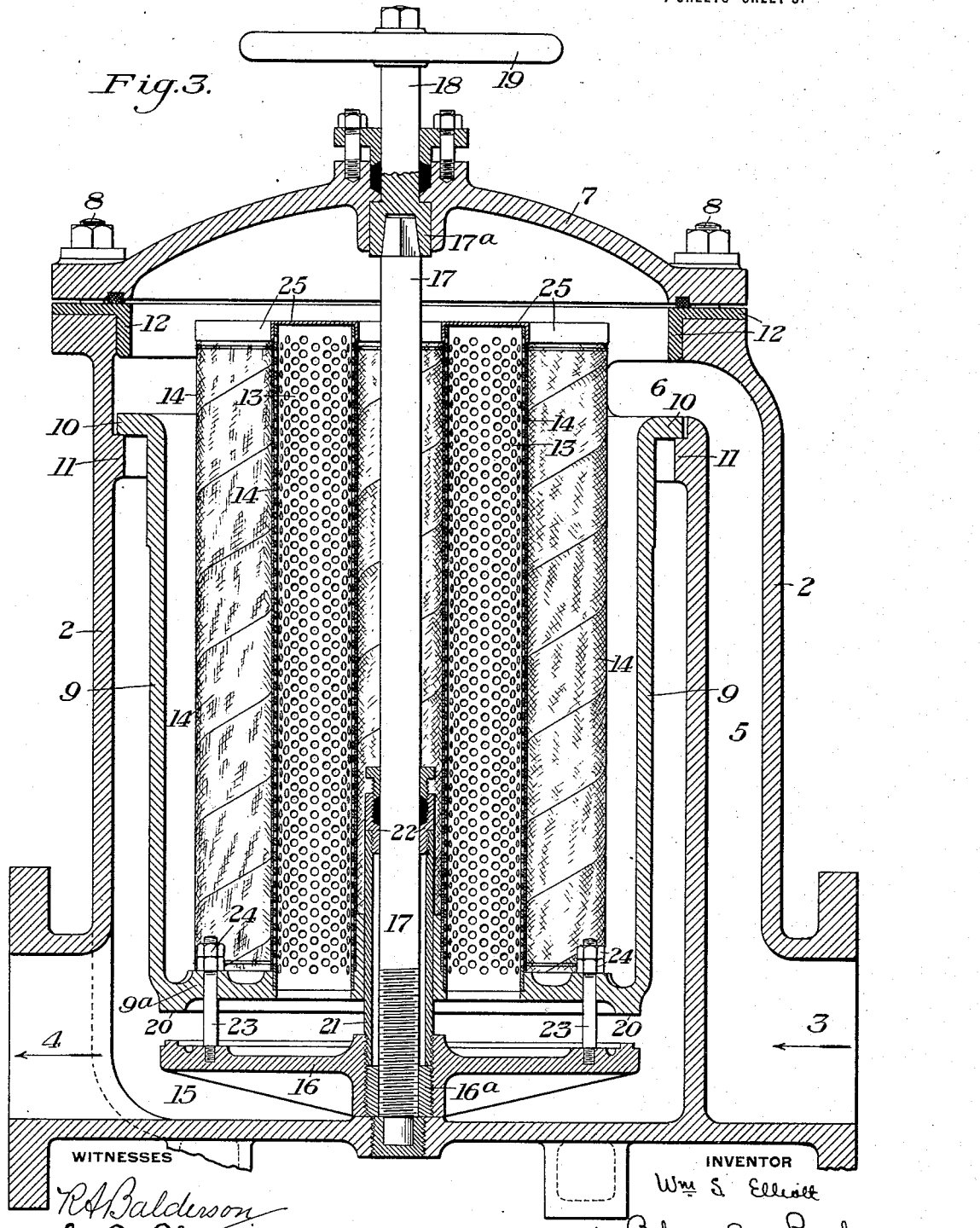

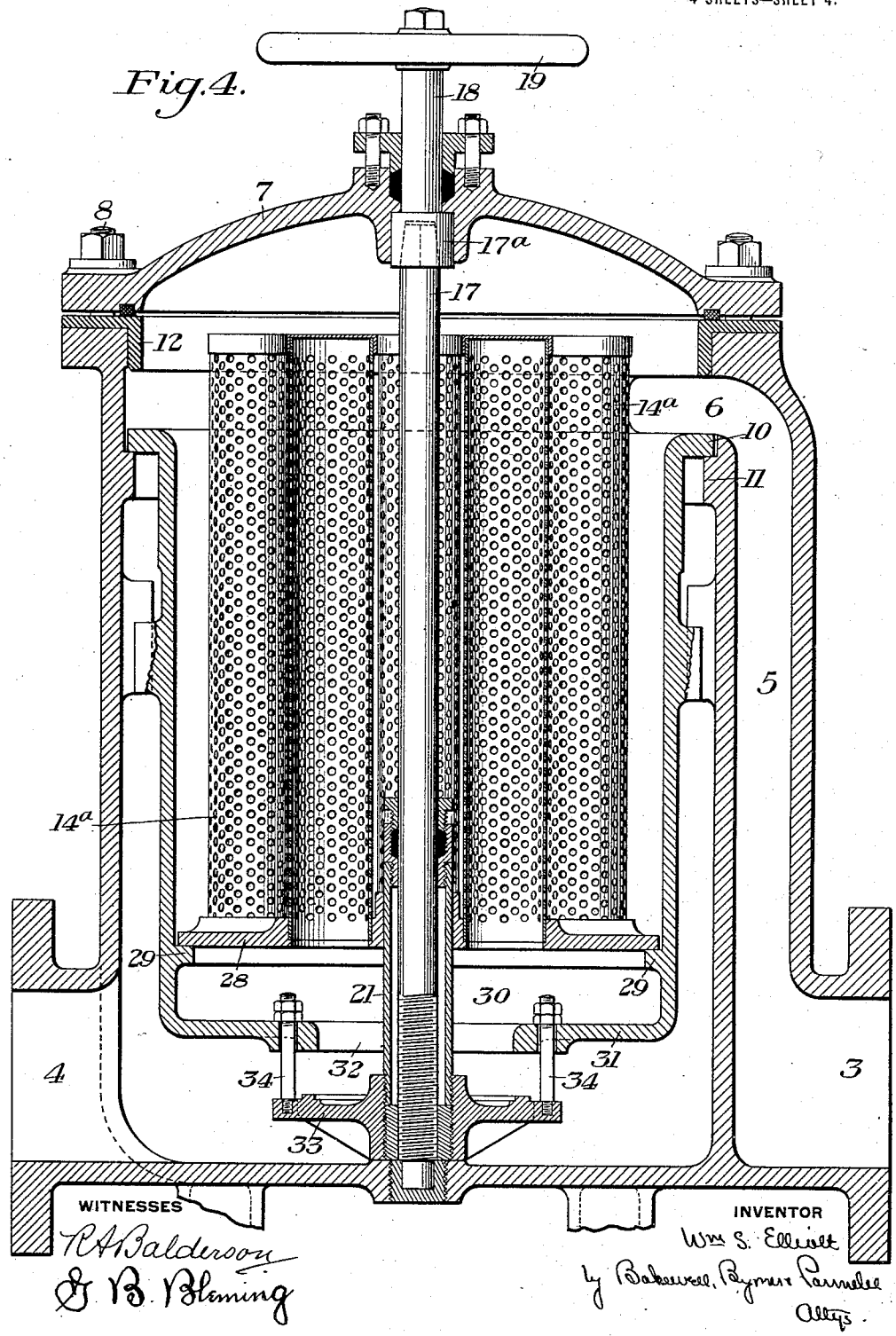

UNITED STATES PATENT OFFICE.

WILLIAM S. ELLIOTT, OF PITTSBURGH, PENNSYLVANIA.

STRAINER OR FILTER.

1,172,689.  Specification of Letters Patent.  Patented Feb. 22, 1916.

Application filed January 8, 1915. Serial No. 1,134.

*To all whom it may concern:*

Be it known that I, WILLIAM S. ELLIOTT, a citizen of the United States, residing at Pittsburgh, in the county of Allegheny and State of Pennsylvania, have invented a new and useful Improvement in Strainers or Filters, of which the following is a full, clear, and exact description, reference being had to the accompanying drawings, forming part of this specification.

My invention has relation to strainers or filters, and is designed to provide a simple and efficient construction and arrangement of the parts, whereby whenever it is necessary to renew or clean the filter or strainer elements, the normal flow through the apparatus may be shut off and the liquid by-passed therethrough from the inlet to the outlet. My invention also provides an apparatus in which the parts are readily accessible for cleaning or for renewals or repairs.

In the drawings: Figure 1 is a transverse section of a strainer or filter embodying my invention; Figs. 2 and 3 are vertical sections taken, respectively, on the line II—II and III—III of Fig. 1, but with some of the parts in different positions; and Fig. 4 is a view similar to Fig. 3, but showing a modification.

Referring first to that form of my invention shown in Figs. 1 to 3, inclusive, the numeral 2 designates the outer shell of the apparatus, this shell in the specific construction shown being in the form of a vertical cylinder having at the bottom at one side an inlet connection 3 and at the opposite side an outlet connection 4. At the inlet side the outer shell has a vertical inlet passage or chamber 5, which communicates at its lower end with the inlet passage 3, and at its upper end with the interior of the shell through the port 6. The outer shell is closed at the bottom and at its upper end has a removable closure 7, which is shown as secured by the bolts 8. The numeral 9 designates a vertically movable inner shell seated concentrically within the chamber of the outer shell and normally supported by the outwardly turned flange 10 at its upper end, which rests on the interior shoulder or ledge 11 of the outer shell. 12 is a seating ring against which the flange 10 is arranged to seat when raised to close the inlet port 6, in the manner hereinafter described. The inner shell 9 carries a plurality of strainer or filter elements. In the present instance, these are shown as consisting of vertically arranged cylindrical tubes 13 of perforated metal, grouped within the chamber of the inner shell around the center thereof and spaced from each other. Where the apparatus is designed to be used as a filter, each element may be wrapped with a covering 14 of suitable filter fabric. Where the device is to be used as a strainer, this wrapping may be omitted, as shown in Fig. 4. The strainer elements are seated at their lower ends in the bottom plate $9^a$ of the inner shell through which plate they open into the bottom chamber 15, which communicates with the outlet 4. In this bottom chamber is a valve plate 16, which is secured to a nut $16^a$, which is engaged by the threaded end portion of a vertical valve rod 17, which extends upwardly through the central portion of the chamber of the inner shell and is engaged at its upper end by the socket portion $17^a$ of an actuating shaft 18, which may be provided with a hand wheel 19, or with other actuating means. The valve member 16 is adapted to seat when raised against the seating lower face 20 of the inner shell, and thus close the lower open ends of the strainer elements. In order to prevent leakage upwardly around the valve rod, the valve plate is provided with an upwardly extending sleeve 21, carrying the stuffing box 22. The valve is guided by means of the guide bolts 23, which are arranged to move freely through apertures in the bottom portion $9^a$ of the inner shell, with retaining nuts 24 at their upper ends. The upper end of each strainer element is shown as being closed by means of a cap 25. The inner shell $9^a$ is held properly centered within the outer shell, and is guided in its vertical movements by means of the lugs 26.

The normal operation is as follows: The parts being in the position shown in Fig. 3, the water or other liquid enters the outer shell at 3 and passes upwardly through the admission chamber 5, and into the interior chamber of the shell through the ports 6. It then fills the chamber of the inner shell around the filter elements and enters the same through the wrapping (if this be used) and through the perforations, and is thence discharged into the bottom chamber 15 and out through the outlet connection 4. If it is desired to shut off the normal flow through the apparatus for any purpose, as for cleaning or renewing the filter elements, the hand wheel 19 is actuated thereby turning the rod 17, in its threaded bearing in the nut 16ª of the valve plate 16. This will raise the valve plate against the seating surface 20 and close off the lower ends of the filter elements. Further actuation of the rod 17 acts through the valve plate 16 to raise the entire inner shell with the filter elements until the flange 10 comes into seating engagement with the lower edge of the seating ring 12, as shown in Fig. 2. This prevents further flow of liquid into the inner shell, and the liquid entering at the port 6 will pass below the flange 10 and into the space between the inner and outer shells and directly to the outlet connection 4. If necessary or desired, the entire inner shell with the filter elements can be removed from the outer shell. 27, 27ª designate a pipe extending to a point near the bottom of the inner shell, and by means of which the contents of said shell may be siphoned or pumped out, or it may be used as a blow-off connection for removing the dirt accumulated in the chamber.

In the modification shown in Fig. 4, the construction is substantially the same as that before described, except that the strainer elements 14ª are supported at their lower ends in a separate plate 28, which rests upon the interior ledge or flange 29 of the inner shell, there being a chamber 30 below this bottom plate and into which the strainer elements discharge. The bottom wall 31 of this chamber 30 has a central discharge opening 32, which is arranged to be closed by a vertically movable valve plate 33, which is generally similar to the valve plate 16, but is of small diameter. This valve plate is guided by the bolts 34. The operation of this form is substantially the same as in the form first described. It permits the use of a smaller valve plate 33, and by reason of the separate supporting means 28, provides means whereby the strainer elements may be readily lifted out of the apparatus, without removing the inner shell.

The advantages of my invention will be readily apparent, since it provides an extremely simple and effective strainer or filter in which ready access may be had to all the parts and in which the necessary cleaning, renewals or repairs may be effected without the necessity of entirely shutting off the flow of water through the apparatus.

I do not desire to limit myself to the particular forms of my invention which I have herein shown and described, as it is obvious that various changes can be made in the form and arrangement of the parts, without departing from the spirit and scope of my invention as defined in the appended claims.

I claim:

1. A strainer or filter, comprising an outer shell having inlet and outlet connections, an inner shell movably supported within the outer shell, a series of filter or strainer elements within the chamber of the inner shell, and means whereby the inner shell can be moved bodily with respect to the outer shell to act as a valve to close off the filter or strainer chamber of the inner shell, substantially as described.

2. Apparatus of the character described, comprising an outer shell having an inlet and an outlet connection, an inner shell movably supported within the outer shell and having a plurality of filter or strainer elements open at one end, a valve member for closing the open end of said elements, and means whereby the inner shell may also be actuated to form a valve to close off the admission of liquid from the outer shell to the filter elements, substantially as described.

3. Apparatus of the character described, comprising an outer shell having an inlet and an outlet connection, an inner shell movably supported within the outer shell and having a plurality of filter or strainer elements open at one end, a valve member for closing the open end of said elements, and means whereby the inner shell may also be actuated to form a valve to close off the admission of liquid from the outer shell to the filter elements, and said outer shell having a bypass passage around the inner shell, substantially as described.

4. Apparatus of the character described, comprising an outer shell having inlet and outlet connections, an inner shell movably supported within the outer shell, there being an inlet port or passage to the inner shell, means for actuating the inner shell to close said port or passage, a plurality of filter or strainer elements carried by the inner shell, and a valve member for closing the discharge ends of said elements, substantially as described.

5. Apparatus of the character described, comprising an outer shell having inlet and outlet connections, an inner shell movably supported within the outer shell, there being an inlet port or passage to the inner shell, means for actuating the inner shell to close said port or passage, a plurality of filter or strainer elements carried by the inner shell, and a valve member for closing the discharge ends of said elements, said valve member having an initial independent movement and being then arranged to engage the inner shell and effect a movement thereof, substantially as described.

6. Apparatus of the character described, comprising an outer shell having inlet and outlet connections at its lower portion and an inlet passage extending from the inlet connection to the interior of said shell through the upper portion thereof, an inner shell loosely supported within the outer shell below said inlet passage, a plurality of filter elements within the inner shell and carried thereby, said elements being open at their lower ends, a vertically movable valve plate for closing the lower ends of said elements, an actuating shaft for said valve plate, said valve plate after being closed exerting a lifting action upon the inner shell and there being a bypass passage between the inner and outer shells, substantially as described.

7. Apparatus of the character described, comprising an outer shell having inlet and outlet connections, an inner shell movably supported within the outer shell and arranged to form a valve to close off the inlet from the outer shell to the interior of the inner shell, a plurality of filter or strainer elements carried by the inner shell and open at their lower ends, a valve member for closing said open lower ends, a centrally arranged actuating rod for the valve member, and a stuffing box for said rod carried by the valve member, substantially as described.

8. A strainer or filter, comprising an outer shell having inlet and outlet connections, an inner shell supported within the outer shell and containing a filter or strainer element open at one end, a valve member for closing the open end of said element, an actuating shaft attached to the valve and extending therethrough and within the inner shell, a tube or sleeve also attached to the valve and surrounding a portion of the stem within the inner shell, and a stuffing box coöperating with said sleeve or tube to prevent leakage through the connection between the valve and its stem, substantially as described.

9. A strainer or filter comprising an outer shell, having inlet and outlet connections, an inner shell movably supported within the outer shell and containing a filter or strainer element open at its lower end, a valve member arranged to close the open lower end of said element, a stem passing through the valve for the purpose of operating the same, a tube or sleeve attached to the valve surrounding the stem within the inner shell, and a stuffing box which engages the stem for the purpose of preventing any leakage flow past the connection between the valve and its stem, substantially as described.

In testimony whereof, I have hereunto set my hand.

WILLIAM S. ELLIOTT.

Witnesses:
W. C. LYON,
H. M. CORWIN.

Copies of this patent may be obtained for five cents each, by addressing the "Commissioner of Patents, Washington, D. C."